(12) United States Patent
Sprague et al.

(10) Patent No.: US 8,519,983 B2
(45) Date of Patent: Aug. 27, 2013

(54) INPUT DEVICE FOR A SCANNED BEAM DISPLAY

(75) Inventors: Randall B. Sprague, Hansville, WA (US); Christian Dean DeJong, Sammamish, WA (US); Gregory T. Gibson, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 1499 days.

(21) Appl. No.: 11/967,156

(22) Filed: Dec. 29, 2007

(65) Prior Publication Data

US 2009/0167726 A1   Jul. 2, 2009

(51) Int. Cl.
*G06F 3/041*  (2006.01)

(52) U.S. Cl.
USPC .......................................... 345/179; 345/183

(58) Field of Classification Search
USPC .......................................... 345/179, 183, 156
See application file for complete search history.

(56) References Cited

U.S. PATENT DOCUMENTS

| | | | |
|---|---|---|---|
| 4,677,428 A | 6/1987 | Bartholow | |
| 5,179,368 A | 1/1993 | Lippincott | |
| 6,377,249 B1 | 4/2002 | Mumford | |
| 7,001,023 B2 | 2/2006 | Lee et al. | |
| 7,252,394 B1 * | 8/2007 | Fu | 353/98 |
| 7,262,563 B2 | 8/2007 | Webb | |
| 7,457,413 B2 | 11/2008 | Thuvesholmen et al. | |
| 7,791,598 B2 | 9/2010 | Bathiche | |
| 2003/0095109 A1 | 5/2003 | Sasaki et al. | |
| 2004/0212553 A1 | 10/2004 | Wang et al. | |
| 2005/0084980 A1 | 4/2005 | Koo et al. | |
| 2005/0099405 A1 | 5/2005 | Dietz et al. | |
| 2005/0206770 A1 * | 9/2005 | Nathanson et al. | 348/333.1 |
| 2005/0248549 A1 | 11/2005 | Dietz et al. | |
| 2005/0264525 A1 * | 12/2005 | Adams et al. | 345/156 |
| 2005/0280628 A1 * | 12/2005 | Adams et al. | 345/156 |
| 2006/0164330 A1 | 7/2006 | Bright et al. | |
| 2006/0170874 A1 * | 8/2006 | Yumiki et al. | 353/42 |
| 2006/0221063 A1 | 10/2006 | Ishihara | |
| 2008/0106493 A1 | 5/2008 | Lach et al. | |
| 2008/0165163 A1 | 7/2008 | Bathiche | |
| 2008/0192007 A1 | 8/2008 | Wilson | |
| 2009/0020344 A1 | 1/2009 | Ringholz et al. | |

FOREIGN PATENT DOCUMENTS

| | | |
|---|---|---|
| EP | 1166199 | 2/2002 |
| JP | 11084343 | 3/1999 |

* cited by examiner

*Primary Examiner* — Yong H Sim
(74) *Attorney, Agent, or Firm* — Kevin D. Wills

(57) ABSTRACT

Briefly, in accordance with one or more embodiments, an input device may be utilized in conjunction with a scanned beam display or the like, or may be based on the scanning platform as used in a scanned beam display such as a MEMS based scanner. An input event such as illumination of a photodetector or reflection of a scanned beam off of a retroreflector may be correlated with a timing event of the scanning platform such as a refresh signal, or a horizontal and vertical sync signals. The correlation of the timing event may be representative of an X-Y location, and in some embodiments of a Z location, that may be utilized to provide input data back to a host device.

8 Claims, 8 Drawing Sheets

INPUT DEVICE FOR A SCANNED BEAM DISPLAY

BACKGROUND

A portable scanned beam display may be utilized to display information via a larger image while still maintaining a smaller form factor. Thus, such a scanned beam display may provide the output function for a mobile device, however an input function may still be required. Typically for a mobile telephone or other similar smaller form factor device, the input function is accomplished by a smaller sized keyboard. Computer users are used to having a larger sized keyboard available and in addition a pointing device, typically a mouse. Known approaches for implementing a touch screen for input typically require some form of planar arranged hardware to detect the absolute X-Y position of the pointing device, which is typically a stylus. Such hardware implementations may comprise capacitive sensing arrays, resistive sensing arrays, wire grid arrays, optical coupling arrays, and pressure sensing arrays, all requiring a two-dimensional hardware structure. In order to provide suitable resolution of movement for the typical user, these hardware structures end up being too bulky for use with portable devices such as cellular telephones.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
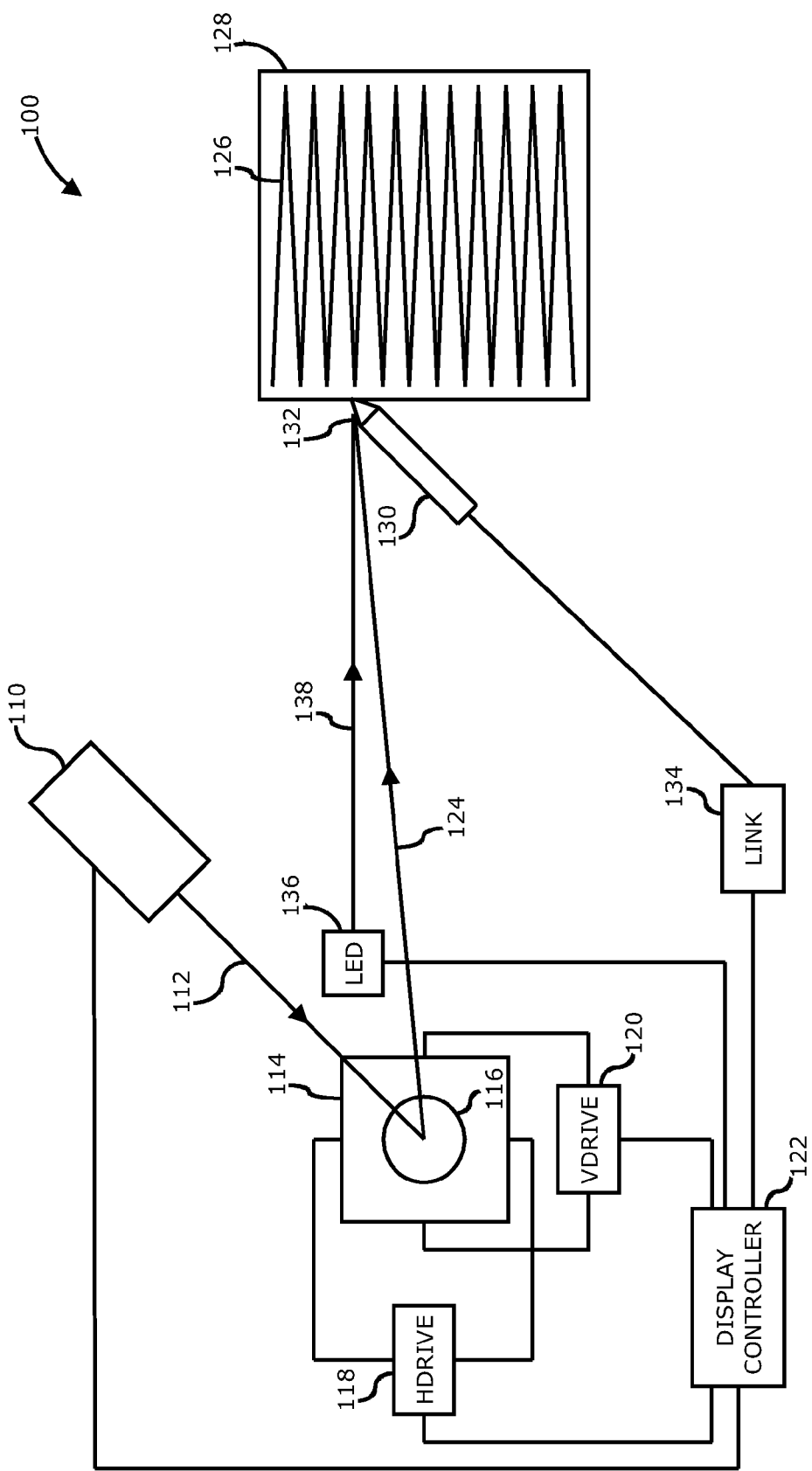
FIG. 1 is a diagram of a scanned beam display having an active input device in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a scanned beam display having an active input device in accordance with one or more embodiments will be discussed. As shown in FIG. 1, scanned beam display 100 comprises a light source 110, which may be a laser light source such as a laser or the like, capable of emitting a beam 112 which may comprise a laser beam. The beam 112 impinges on a scanning platform 114 which may comprise a MEMS based scanner or the like, and reflects off of scanning mirror 116 to generate a controlled output beam 124. A horizontal drive circuit 118 and a vertical drive circuit 120 modulate the direction in which scanning mirror 116 is deflected to cause output beam 124 to generate a raster scan 126, thereby creating a displayed image 128, for example on a projection surface. A display controller 122 controls horizontal drive circuit 118 and vertical drive circuit 120 by converting pixel information of the displayed image into laser modulation synchronous to the scanning platform 114 to write the image information as displayed image 128 based upon the position of the output beam 124 in raster pattern 126 and the corresponding intensity and/or color information at the corresponding pixel in the image. Display controller 122 may also control other various functions of scanned beam display 100.

In one or more embodiments, an input device may comprise a stylus 130 or the like having a photodiode 132 disposed at an end of the stylus 130. If stylus 130 is placed on or near displayed image 128 so that output beam 124 impinges on stylus 130, photodiode 132 may generate an electrical pulse in response to the photo energy of output beam 124. The timing of this electrical pulse may be correlated with the horizontal sync signal and/or vertical sync signal for driving scanning platform 114 in order to determine the location of photodiode 132 so that its location may be correlated to a pixel in the displayed image 128. In order to correlate the timing of the pulse with the horizontal and/or vertical sync signals, in one or more embodiments the correlation may be performed by circuitry disposed in stylus 130. Display controller 122 may drive a light emitting diode (LED) 136, which may comprise an infrared (IR) diode so that its output beam 138 is not visible to the user and does not interfere with the viewability of displayed image 128. The horizontal and/or vertical sync information may be transmitted to stylus 130 by LED 136 via LED output beam 138 which may be detected by photodiode 132 of stylus 130. After correlating the electrical pulse generated via output beam 124 with the horizontal and/or vertical synch signals, stylus 130 may transmit the resulting position information to display controller 122 via link 134. In one or more embodiments, link 134 may comprise a wired link via a cable connection between stylus 130 and display controller 122, or alternatively link 134 may comprise a wireless link such as a radio-frequency (RF) link. In one particular embodiment, link 134 may comprise a BLUETOOTH link as specified by the BLUETOOTH Special Interest Group (SIG), although the scope of the claimed subject matter is not limited in this respect.

In one or more embodiments, a fast scan axis may refer to the horizontal direction of raster scan 126 and the slow scan axis may refer to the vertical direction of raster scan 126. Scanning mirror 116 sweep the output beam 124 left and right at a higher frequency and also vertically at a relatively lower frequency. The result is a scanned trajectory of laser beam 124 to result in raster scan 118. Each pixel in the displayed image 128 is illuminated by output beam 124 at the exact same instant in time within each frame. Because each and every pixel in the projected image is illuminated at the exact same time with respect to the start of the refresh frame, it is possible to determine the X-Y position of a given pixel simply by knowing its timing relative to the start of the refresh frame.

In one or more embodiments, instead of correlating the timing of the pixel to the start of a refresh frame, for noise and precision reasons it may be more accurate to correlate the pixel timing relative to the start of the horizontal sync to obtain the X position and to the start of the vertical sync to obtain the Y position. Such an arrangement may produce better precision and stability in the X dimension. Thus, in one or more embodiments, stylus 130 may detect the timing of the illumination of a selected pixel via illumination of photodiode 132 and correlate the pixel illumination to the horizontal scanner sync pulse and/or to the vertical scanner sync pulse.

Stylus 130 may be utilized to identify the selected pixel by placing the tip of the stylus 130 on a selected pixel in or proximate to displayed image 128 for determining the X-Y position of the pixel in displayed image 128. The output beam 124 illuminates the tip of stylus 130, which is detectable by photodiode 132. The timing of this illumination of photodiode 132 provide a pixel timing signal, display controller 122 contains the timing information for the V-sync and H-sync timing signals. In order to correlate the three timing pulses to compute the X-Y position of the selected pixel, the three signals should be available to a single electronic circuit disposed either in stylus 130 or in display controller 122. Thus, in one embodiment stylus 130 communicates the pixel timing signal to display controller, and in an alternative embodiment display controller 122 communicates the V-sync and H-sync signals to stylus 130.

In the embodiment shown in FIG. 1, stylus 130 may comprise an active device that is capable of computing the X-Y position of a selected pixel wherein display controller 122 communicates the V-sync and H-sync signals to stylus 130. In this embodiment, the selected pixel illumination timing may be measured via photodiode 312 disposed on the end of stylus 130 when stylus is placed on or near displayed image at the selected pixel location. When the selected pixel is illuminated by output beam 124, photodiode 132 will detect light and generate an electrical response to the detected light, which may be represented as a pulse in response to the temporary illumination of photodiode 132 during the sweep of output beam 124 in raster scan 118. The rising or falling edge of the photodetector output may then be used as a timing pulse for the selected pixel. In one or more embodiments, photodiode 132 may be disposed at an end of stylus 130 held by the user, or alternatively photodiode 132 may be disposed on various other instruments or device that may be used in a similar fashion as a stylus or other input device, for example on a mouse, on a joystick, on a cellular telephone, personal digital assistant, track ball, laser pointer, and so on, and the scope of the claimed subject matter is not limited in this respect.

In order to send the V-sync and H-sync signals to stylus 130, display controller 122 may use the vertical sync and horizontal sync signals to drive a light-emitting diode (LED) 136, which may comprise an infrared (IR) LED, disposed in or near scanned beam display 100 to generate LED output beam 138 which may contain the V-sync and H-sync signals. Photodiode 132 within stylus 130 detects the LED output beam 138 and generates corresponding timing pulses in response thereto. Stylus 130 now has the V-sync signal, the H-sync signal, and the pixel illumination signal from which to compute the X-Y position of the selected pixel. The V-sync and H-sync pulses from LED 136 may comprise a sequence of relatively fast pulses to distinguish themselves from each other, and from the pulse caused by the pixel illumination. Circuitry within stylus 130 may then computer the X-Y position of the selected pixel based at least in part on correlating the timing of the pixel illumination pulse with the V-sync and H-sync signals, further details of which are discussed with respect to FIG. 3, below. In one or more embodiments, communication of the V-sync and H-sync signals does not need to be accomplished via optical IR pulsing of LED 136, and alternatively such communication may be accomplished via wireless transmission for example using a radio-frequency signal, or via direct wire transmission, and the scope of the claimed subject matter is not limited in this respect.

Figure 2:
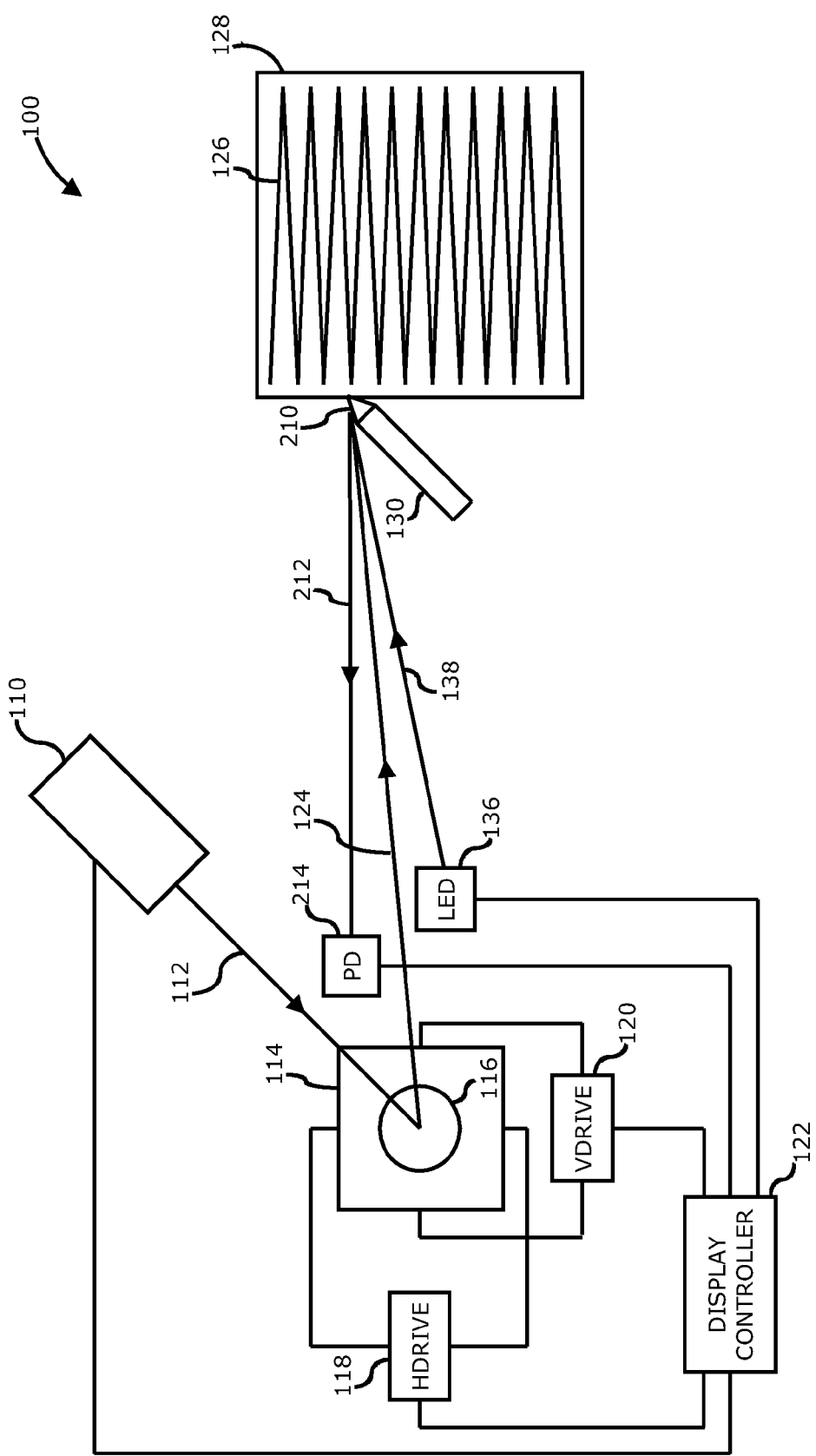
FIG. 2 is a diagram of a scanned beam display having a passive input device in accordance with one or more embodiments.

Referring now to FIG. 2, a diagram of a scanned beam display having a passive input device in accordance with one or more embodiments will be discussed. In the embodiment of scanned beam display 100 shown in FIG. 2, display controller 122 may compute the X-Y position of the selected pixel based on having stylus 130 communicate the pixel illumination timing signal to display controller 122. The selected pixel illumination timing may be measured by using a retroreflector or similar reflector placed on the display surface at or proximate to the selected pixel location. In one or more embodiments, this may be accomplished with a retroreflector 210 disposed on an end of stylus 130 in lieu of photodiode 132 as shown in FIG. 1. When the selected pixel is illuminated by output beam 124, retroreflector 210 will reflect some of selected pixel's light back toward scanned beam display 100. A photodiode 214 disposed in or near scanned beam display is capable of detecting this reflected light from retroreflector 210 as reflected beam 212 to generate an electrical pulse in response. The rising or falling edge of the electrical signal generated by photodetector 214 can be provided to display controller 122 to be used as a timing pulse for the pixel illumination. Display controller 122 at this point has the selected pixel timing signal from photodetector 214 to correlate to the V-sync and H-sync signals that display controller 122 already has.

In either embodiment shown in FIG. 1 and FIG. 2, whether stylus 130 computes the selected pixel X-Y position or the display controller 122 performs the computation, either device may also communicate the X-Y position back to a host computing device, for example to a host personal computer (PC) or cellular telephone from which the image data displayed in displayed image 128 by scanned beam display may be provided. Where display controller 122 computes the pixel X-Y position, a retroreflector 210 equipped stylus 130 may be completely passive with no need for batteries, although the scope of the claimed subject matter is not limited in this respect. In one particular embodiment the host device may comprise a cellular telephone having scanned beam display incorporated in the housing of the phone, therefore display controller 122 may compute the X-Y position since display controller 122 may already be closely connected to the cell phone via direct wired link. In another particular embodiment, the host device is a laptop computer, stylus 130 communicate the X-Y position and then communicate that information to the host laptop computer, which may be accomplished via a wireless radio-frequency (RF) link, optical infrared link, or direct wired link, although the scope of the claimed subject matter is not limited in this respect.

In one or more embodiments, stylus 130 may be utilized in conjunction with scanned beam display 100 to implement the pointing function of a mouse as shown in and described with respect to FIG. 1 and/or FIG. 2. In one or more embodiments, other mouse functions may be implements, for example conventional mouse buttons, wherein actuation of such buttons may be communicated back to the host device. If stylus 130 is computing and communicating the X-Y position, adding one or more buttons to stylus 130 to provide mouse button actuation information may implemented via conventional circuitry. However, if display controller 122 of scanned beam display 100 is computing and communicating the X-Y position, stylus 130 may also communicate mouse button actuation. Communication of such mouse button actuation information to the host device can be accomplished via wireless or optical circuitry, however this requires an otherwise passive stylus 130 with a retroreflector 210 to become powered. In an alternative embodiment, two or more retro reflectors 210 may be utilized, and an actuation of a mouse type button on stylus 130 may shadow at least one of the retroreflectors 210 from photodetector 214. In such an arrangement, display controller 122 may interpret the loss of reflected signal 212 from one of the two or more retroreflectors 210 as a button actuation. In some respects, such communication may be a passive optical communication link, thereby eliminating a need for batteries or other power source in the stylus 130.

Figure 3:
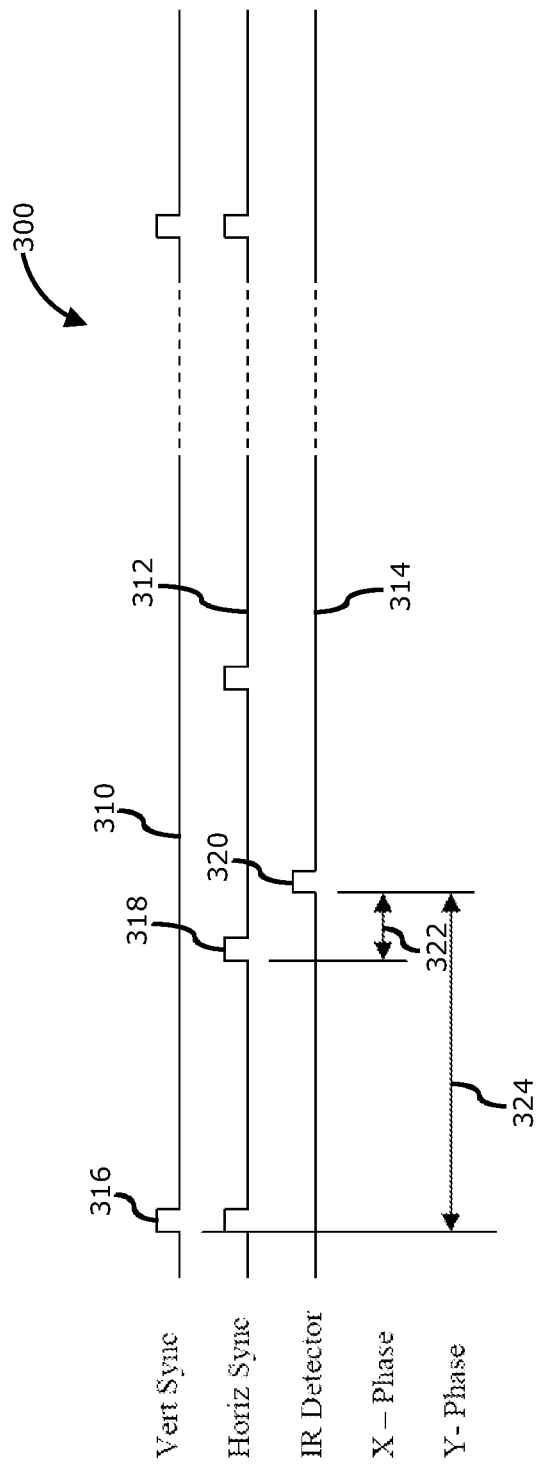
FIG. 3 is a timing diagram of synch signals for a scanned beam display from which a position of an input device may be determined in accordance with one or more embodiments.

Referring now to FIG. 3, a timing diagram of sync signals for a scanned beam display from which a position of an input device may be determined in accordance with one or more embodiments will be discussed. As shown in timing diagram 300 of FIG. 3, the V-sync signal 310 and the H-sync signal 312 for raster scan 126 may be utilized to compute the X-Y position of a selected pixel. The X position of the selected pixel may be computed from the pixel illumination signal 314 by correlating the phase of the pixel illumination pulse 320 relative to the horizontal sync pulse 318. The time difference 322 between the pixel illumination pulse 320 and the horizontal sync pulse 318 is representative of the timing of the selected pixel with respect to the sweep of output beam 124 in raster scan 126, and thereby corresponds to the X position of the selected pixel. Since the sweep of output beam 124 in raster scan 126 may not have a uniform velocity over all of X, an adjustment may be made to map the time difference 322 to the proper X position. Fundamentally, each pixel along the horizontal scan trajectory of output beam 124 corresponds to a particular and repeatable timing phase delay 322 from the horizontal sync pulse 318. Similarly, the Y position of the selected pixel may be computed from the timing phase delay 324 between the pixel illumination pulse 320 relative to the vertical sync pulse 316. Again, adjustment in the mapping between timing of the illumination pulse and the corresponding Y position may be made to account for vertical over scan.

In one or more embodiments, computation of the X and Y positions may be made via a look up table that uses the measured phase delays 322 and 324 as the address into the look up table. Alternatively, the X-Y positions may be computed algebraically using the measured phase delays and known phase offsets of the video output to the V-sync pulses 316 and H-sync pulses 328. Whether stylus 130 is active with a photodiode 132 or passive with a retroreflector 210, in some embodiments the detecting device is likely to capture illumination from more than one pixel of displayed image 128. In the horizontal direction this may result in a longer pulse width. This may be accounted for by determining the X position can be taken as the center or alternatively the leading edge of the longer pulse. However, in the vertical direction it is likely that multiple pulses will be generated from adjacent rows of scanning. A position determining decode algorithm can either compute the Y position based on the first of such pulses, or based on an average of all pulses. As long as the algorithm is consistent, the user will have sufficient control of which pixel the user is selected via stylus 130. IN one or more embodiments, it is possible to utilize more than one stylus 130 simultaneously. Sorting out the multiple pixel timing pulses 320 generated by multiple retroreflectors 132 could may be performed by display controller 122 with additional complexity in the position determining decode algorithm, Alternatively, if each stylus 130 computed its own pixel X-Y position, little addition complexity would be added to scanned beam display 100. In one or more embodiments, an application in which multiple styluses 130 could be used is for a virtual key board. An example virtual keyboard application for scanned beam display 100 is shown in and described with respect to FIG. 7, below.

Figure 4:
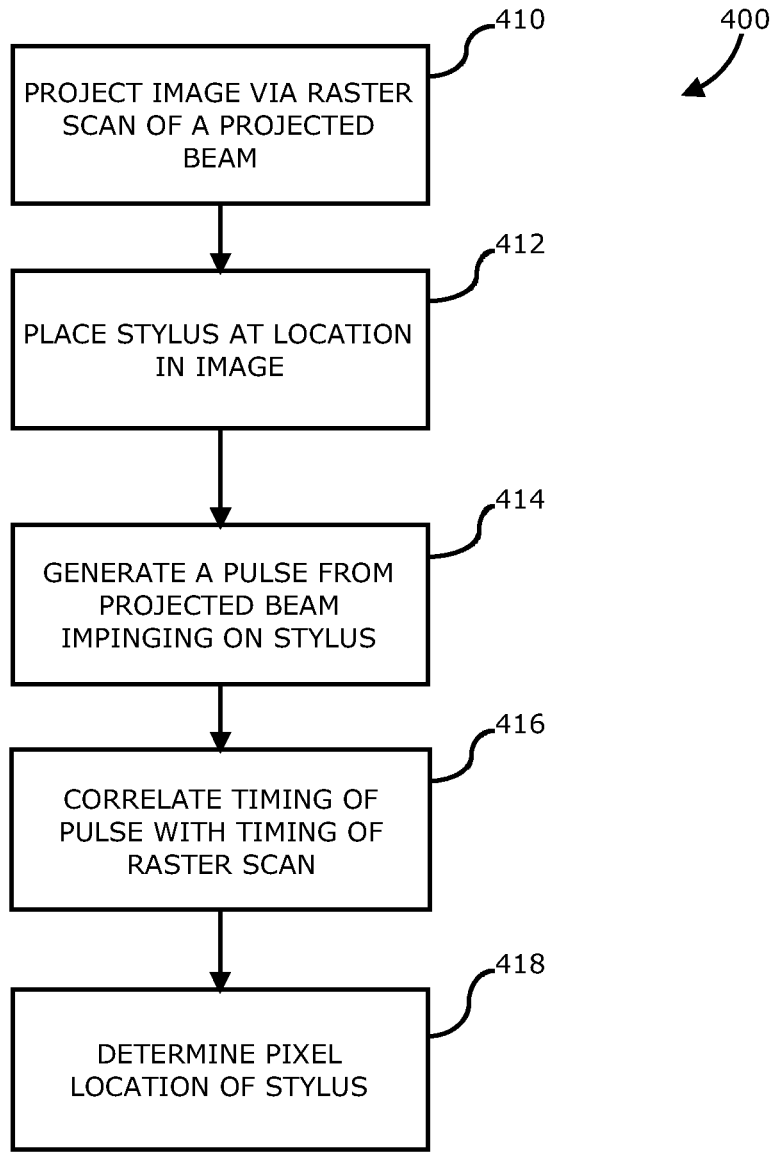
FIG. 4 is a flow diagram of a method to determine a location of an input device in conjunction with a scanned beam display in accordance with one or more embodiments.

Referring now to FIG. 4, a flow diagram of a method to determine a location of an input device in conjunction with a scanned beam display in accordance with one or more embodiments will be discussed. Method 400 shown in FIG. 4 may represent one particular method for operating an input device such as stylus 130 in conjunction with scanned beam display 100, and other alternative methods likewise may be utilized. Furthermore, method 400 may include more or fewer blocks than shown in FIG. 4, and/or the blocks may be arranged in various other orders, and the scope of the claimed subject matter is not limited in this respect. As shown in FIG. 4, an image may be projected at block 410 via a raster scan 126 of a projected output beam 124. At block 412, a user may place a stylus 130 at a location in an image corresponding to at least one selected pixel in the image. A pulse may be generated at block 414 from the projected output beam 124 impinging on stylus 130 at the location of the selected pixel. The timing of the pulse may be correlated with the timing of the raster scan 416, for example with a refresh frame, and/or with a horizontal sync signal and a vertical sync signal. Based at least in part on the correlation between the timing of the pulse with the timing of the raster scan 126, a determination may be made at block 418 the location of the selected pixel in the displayed image 128, and as a result also of the location of the stylus 130. The location information may be utilized to provide input information into a device such as a mobile telephone or personal computer from which the image data is provided such that the mobile telephone or personal computer may be controlled by the user with the stylus, for example via a graphical user interface, although the scope of the claimed subject matter is not limited in this respect.

Figure 5:
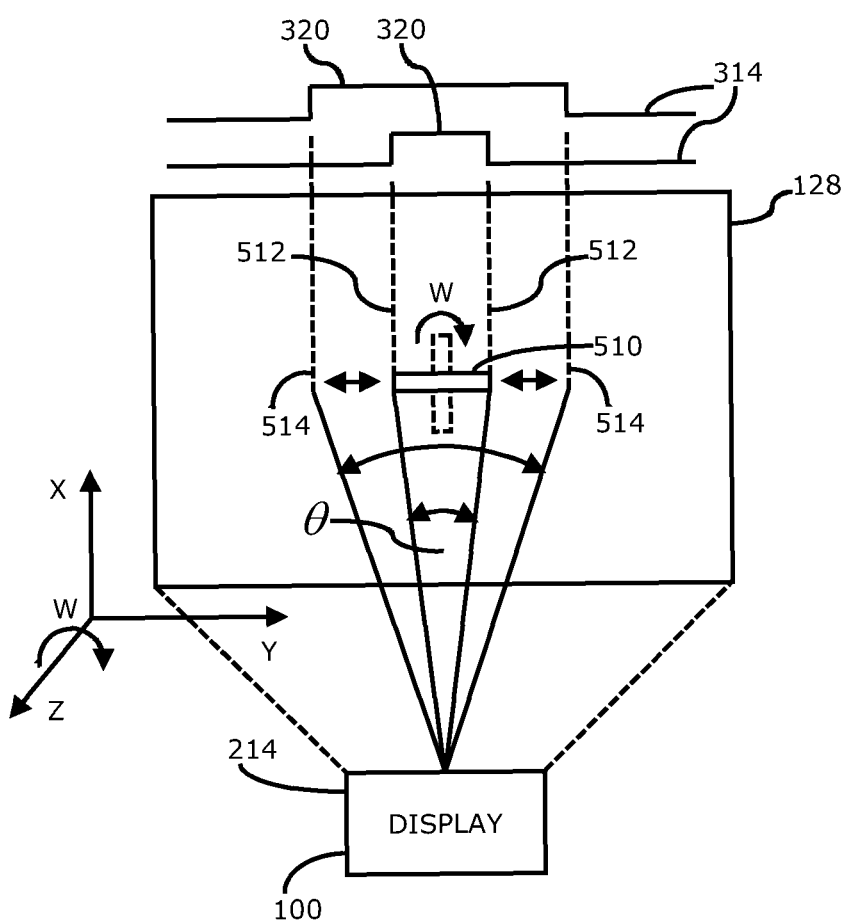
FIG. 5 is a diagram of a scanned beam display having an input device capable of providing three-dimensional location information, and also rotational information, of the input device in accordance with one or more embodiments.

Referring now to FIG. 5 is a diagram of a scanned beam display having an input device capable of providing three-dimensional location information, and also rotational information, of the input device in accordance with one or more embodiments will be discussed. In one or more embodiments, projector 100 may project a displayed image 128 on a projection surface such as a wall, screen, and so on. Stylus 130 may comprise a reflector or photodiode having a predefined shape 510 such as a rectangle or the like wherein shape 510 may be longer in one direction than in another direction as an example. In such embodiments, photodetector 214 of display 100 may detect the reflection or illumination, or the shadow, from shape 510 to determine the location of shape 510 with respect to raster scan 126 in a manner as described with respect to FIG. 1 or FIG. 2, above that are the X-Y coordinates of shape 510 in a plane that may be generally parallel with a plane of display 128. In one particular embodiment, shape 510 may have a size corresponding to a number of pixels in displayed image 128. For example, if displayed image 128 comprises a 600 by 800 pixel image, and shape 510 is positioned to occupy 1% of the displayed image 128 in the horizontal X direction, then shape 510 will have a pixel width of about 8 pixels in the horizontal X direction. Thus, shape 510 may cast a reflection, illumination, or shadow, that subtends an angle, $\theta$, of displayed image 128 emanating from display 100. As stylus 130 is moved closer to displayed image 128 in the Z direction and away from display 100, the size of shape 510 decreases in the number of pixels of displayed image 128 that shape 510 occupies, and the angle $\theta$ that the reflection or illumination of shape 510 occupies becomes smaller. As a result, the width of pulse 320 will decrease in time due to the reflection or illumination, or shadow, of shape 510 for a shorter percentage of the horizontal sweep of raster scan 126. Furthermore, the size of shape 510 will also be smaller in the vertical Y direction so the number of illumination pulses 320 will decrease for a given frame. Likewise, as shape 510 is moved away from displayed image 128 and toward display 100, the size of shape 510 increases in the number of pixels of displayed image 128 that the reflection or illumination, or shadow, of shape 510 occupies.

Thus, the position of stylus 130 along the Z axis with respect to the X-Y plane of displayed image 128 may be utilized to encode additional input information to a host device. For example, when stylus 130 is at a first Z position, the reflection or illumination, or shadow, of shape 510 will have a first size, and the corresponding pulse 320 of the pixel position signal 314 may have a first pulse width 512. When stylus 130 is moved to a second Z position farther away from displayed image 128 than the first Z position, reflection or illumination, or shadow, of shape 510 will have a second, larger size, and the corresponding pulse 320 of the pixel position signal 314 may have a second pulse width 514 that is larger than the first pulse width 512. As a result, the width, or duration in time, of the pixel position pulse 320, and/or the number of pulses 320 generated in a given frame may be utilized to provide additional input functions for stylus 130 based on the Z position of stylus 130 with respect to displayed image 128. For example, the Z position of stylus 130 may indicate to the host device when stylus 130 is touching the display surface and when stylus 130 has been lifted from the surface. Thus, a double tap of a location in displayed image 128 with stylus 130 may correspond to a double mouse click. Similarly, when stylus 130 is used to ink the user's handwriting on the displayed image 128, the Z information can be used by the device to know when to apply ink and when not to apply ink to capture the naturally handwriting motion of the user with stylus 130. Likewise, the Z information may be utilized to control other input functions in a graphical user interface. For example, if the displayed image 128 is a three-dimensional image such as in computer aided design (CAD), the Z information may be used to zoom in or out in the image, or to rotate a three-dimensional object in the displayed image. In one or more embodiments, stylus 130 may comprise other various types of input devices other than a stylus, for example a joystick or a wand to provide additional degrees of input information. For example, the housing of the joystick may include a first photodiode or retroreflector to encode input information based on the location of the housing with respect to displayed image 128, the tip of the joystick may include a second photodiode or retroreflector to encode input information based on the movement of the joystick with respect to the displayed image 128, and the housing of the joystick may include a laser diode for projecting a spot 510 onto the projection surface to encode input information based on the Z direction movement of the housing of the joystick with respect to displayed image 128. Other alternative input devices likewise could be implemented, and the scope of the claimed subject matter is not limited in this respect.

Furthermore, as shown in FIG. 5, since shape 510 of the reflector or photodiode at the end of stylus 130 may be longer in a first direction than in a second direction, the rotation of shape 510 may be detected to encode a rotation value W in addition to encoding three-dimensional coordinate information along the X, Y, and Z axes. When shape 510 is disposed generally horizontally, the reflection or illumination due to shape 510 will result in a first width of pulse 320 corresponding to the number of pixels in the horizontal X direction occupied by shape 510, and also to a first number of pulses 320 generated per frame based on the number of scan lines in the vertical Y direction occupied by shape 510. When shape 510 is rotated 90 degrees, the reflection or illumination due to shape 510 will result in a second width of pulse 320 that is smaller than the first width of pulse when shape 510 was aligned horizontally. Likewise, shape 510 will generate a second number of pulses 320 in a given frame that is greater than the first number of pulses 320 due to shape 510 occupying a larger number of scan lines in the vertical Y direction. By examining a ratio of the number of pulses 320 generated versus the pulse width of those pulses, a determination of the angular rotation W of shape may be made, so that rotation of stylus 130 may further encode information. For example, the image of displayed image 128, or an object in the displayed image 128, may be rotated according to the angular rotation of stylus 130 via the detected rotation of shape 510. Likewise, the inputs of two or more styluses 130 may be individually detected by detecting a specific angular rotation of the shape 510 of a given stylus 130. Alternatively, each stylus may have a unique shape 510 that may be detectable by the host device in a similar manner. Various other inputs to a host device may likewise be controlled via rotation of stylus 130 in the W direction, for example volume, brightness, line width for pen input, and so on, and the scope of the claimed subject matter is not limited in these respects.

Figure 6:
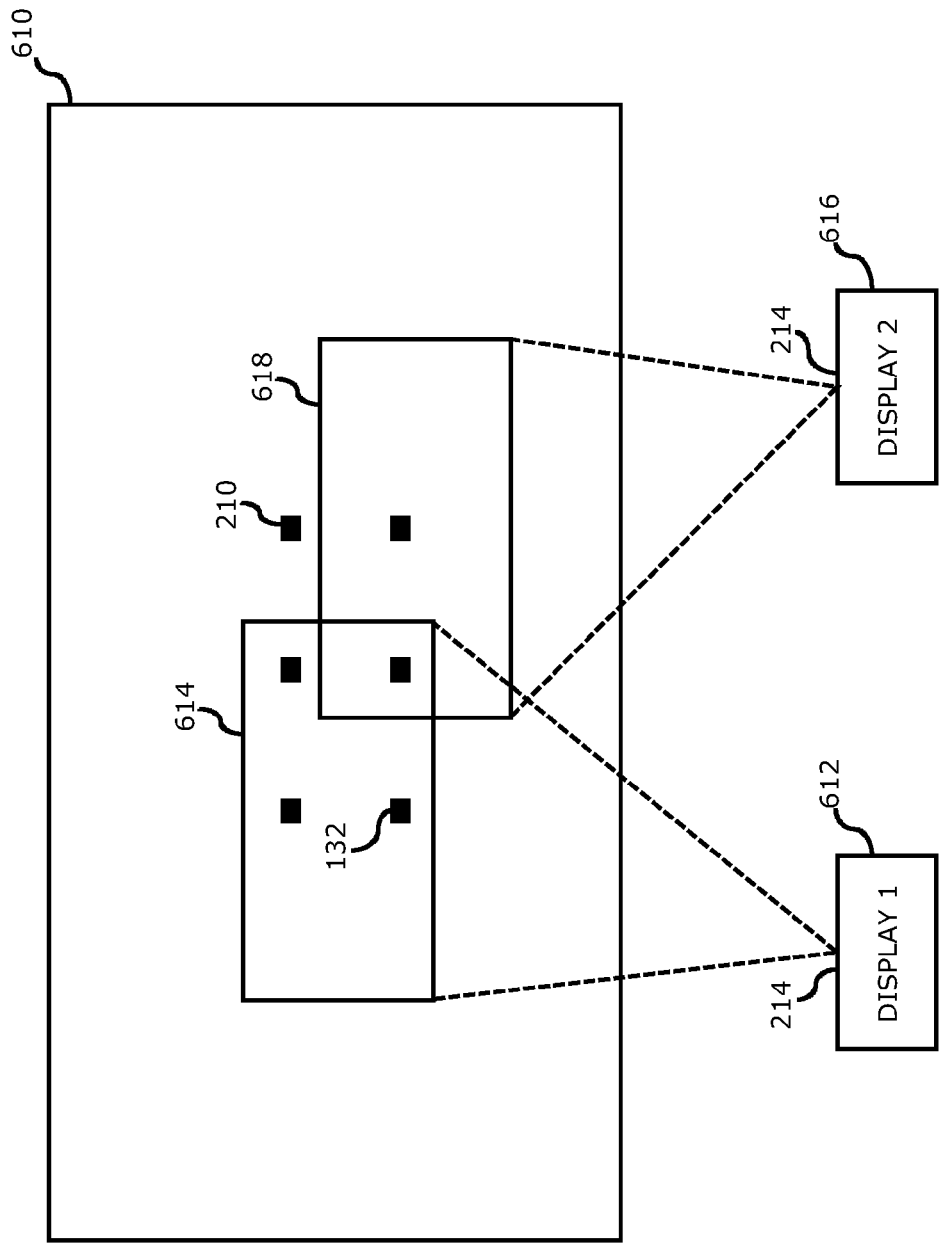
FIG. 6 is a diagram of two or more scanned beam displays capable of determining a relative position of the display with respect to display surface and/or with respect to an image of another display device in accordance with one or more embodiments.

Referring now to FIG. 6, a diagram of two or more scanned beam displays capable of determining a relative position of the display with respect to display surface and/or with respect to an image of another display device in accordance with one or more embodiments will be discussed. In one or more embodiments as shown in FIG. 6, one or more retroreflectors 210 or photodiodes 132 could be affixed to a projection surface 610 such as a wall or projection screen. As the user moves a first display 612 or a second display 616 with relative to fixed retroreflector 210, the position of retroreflector 210 will move with respect to a first displayed image 614 or a second displayed image 618. It should be noted that first display 612 and/or second display 616 may be substantially similar to display 100 of FIG. 1 or FIG. 2, and first displayed image 614 and/or second displayed image 618 may be substantially similar to displayed image 128. The resulting computed X-Y position of the pixel of displayed image illuminating retroreflector 210, or alternatively photodiode 132, may be utilized to compute the angular display 612 or display 616. This information can be used for projector pointing angle feedback for video games and/or other applications.

In one or more embodiments, multiple retroreflectors 210 or photodiodes 132 may be placed on projection surface 610. As the user aims display 612 or display 616 at various locations along projection surface, different retroreflectors 210 or photodiodes 132 would be illuminated and at different pixel locations of displayed image 614 or displayed image 618. With a sufficient number of retroreflectors 210 or photodiodes 132 placed on projection surface 610, and/or other additional surfaces, full 360 degree pointing position determination could be achieved with drift free accuracy. In one or more particular embodiments, using the arrangement as shown in FIG. 6, two or more displays 612 and 616 may be utilized concurrently so that that either display may determine when the displayed image 614 of first display 612 at least partially overlaps with the displayed image 618 of second display 616 since by using fixed position retroreflectors 210 or photodiodes 132, position of displayed image 614 or 618 on display surface 610 may be known. In such embodiments, there may be a link between first display 612 and second display 616, for example a BLUETOOTH type link as shown in FIG. 1 or an infrared link as shown in FIG. 2 between stylus 130 and display controller 122. Display 612 and display 616 may communicated their own V sync and H sync signals to each other so they each display can determine the position of its own image with respect to the image of the other display. Such an arrangement may be useful for example in a video game or the like where each player has his own display, and the game relates to the interaction of one displayed image 614 with respect to another displayed image 618, however the scope of the claimed subject matter is not limited in this respect.

Figure 7:
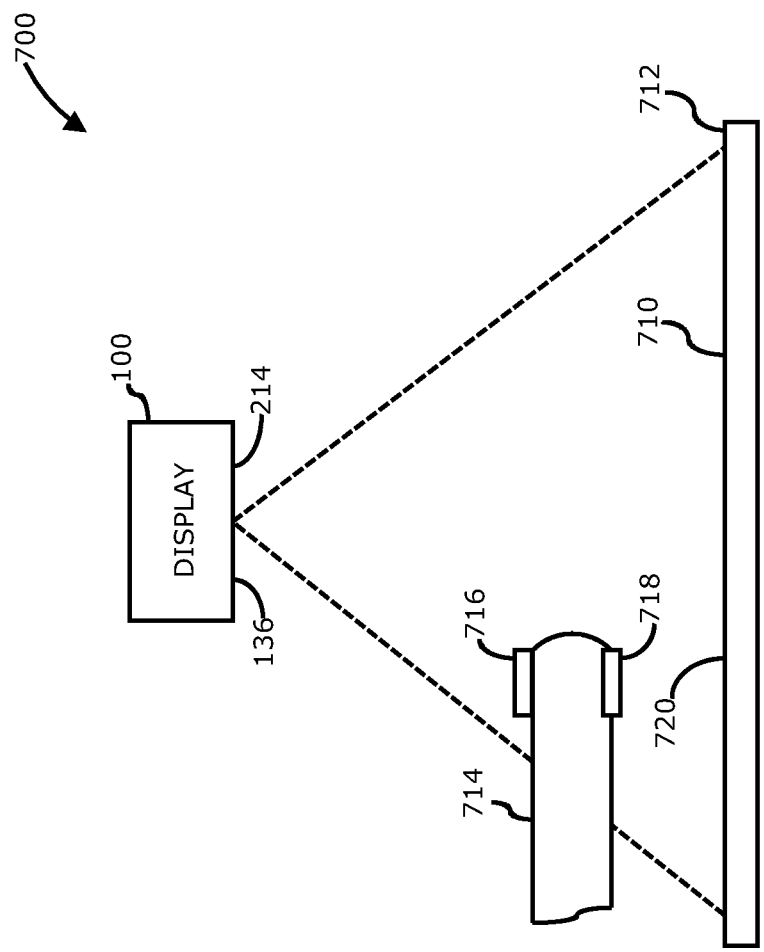
FIG. 7 is a diagram of an input device for a scanned beam display capable of determining a location of a finger of a user in accordance with one or more embodiments.

Referring now to FIG. 7, a diagram of an input device for a scanned beam display capable of determining a location of a finger of a user in accordance with one or more embodiments will be discussed. In one or more embodiments, photodetector 716 could be mounted on top of each fingernail of the user's hands, where the photodetector 716 could be a photodiode 132 or retroreflector 210 for example. In one particular embodiment, this may be accomplished via a glove 714 or similar device that the user wears by placing his fingers in the glove 714 to which the photodetector 716 is attached as a way to dispose the photodetector 716 at the end of the user's finger approximately near the fingernail. A button 718 or other actuator could be mounted on the typing surface of each finger tip of the user's hands, again using a glove 715 or the like for example. As the user presses his finger tip onto a passive flat projection surface 712, the button 718 is pressed signaling the photodetector 716 to capture the X-Y position of that particular finger. Display 100 may be positioned to project an image of a virtual keyboard 710 onto projection surface 712, and may include LED 136 and/or photodiode 214 as shown in and describe with respect to FIG. 1 or FIG. 2. The position of the user's finger, and thus the position of photodetector 716, may correspond to the position of a virtual key 720 of virtual keyboard 710. This information could then be used to determine which virtual key 720 that the user's finger pressed, which may be provided to the host device for entry of that particular key. In one or more embodiments, the buttons 718 located at the user's finger tip could provide tactile feedback in a manner similar to a real keyboard to providing confirmation to the user that the virtual key 720 had been depressed to simulate the typing experience of a real keyboard for the user. In one or more embodiments, the mounting of photodetectors 716 and/or the buttons 718 to the user's finger tips could be accomplished by use of a glove 714 worn by the user, or alternatively via an adhesive, or via structures worn on just the finger tips, however the scope of the claimed subject matter is not limited in this respect.

Figure 8:
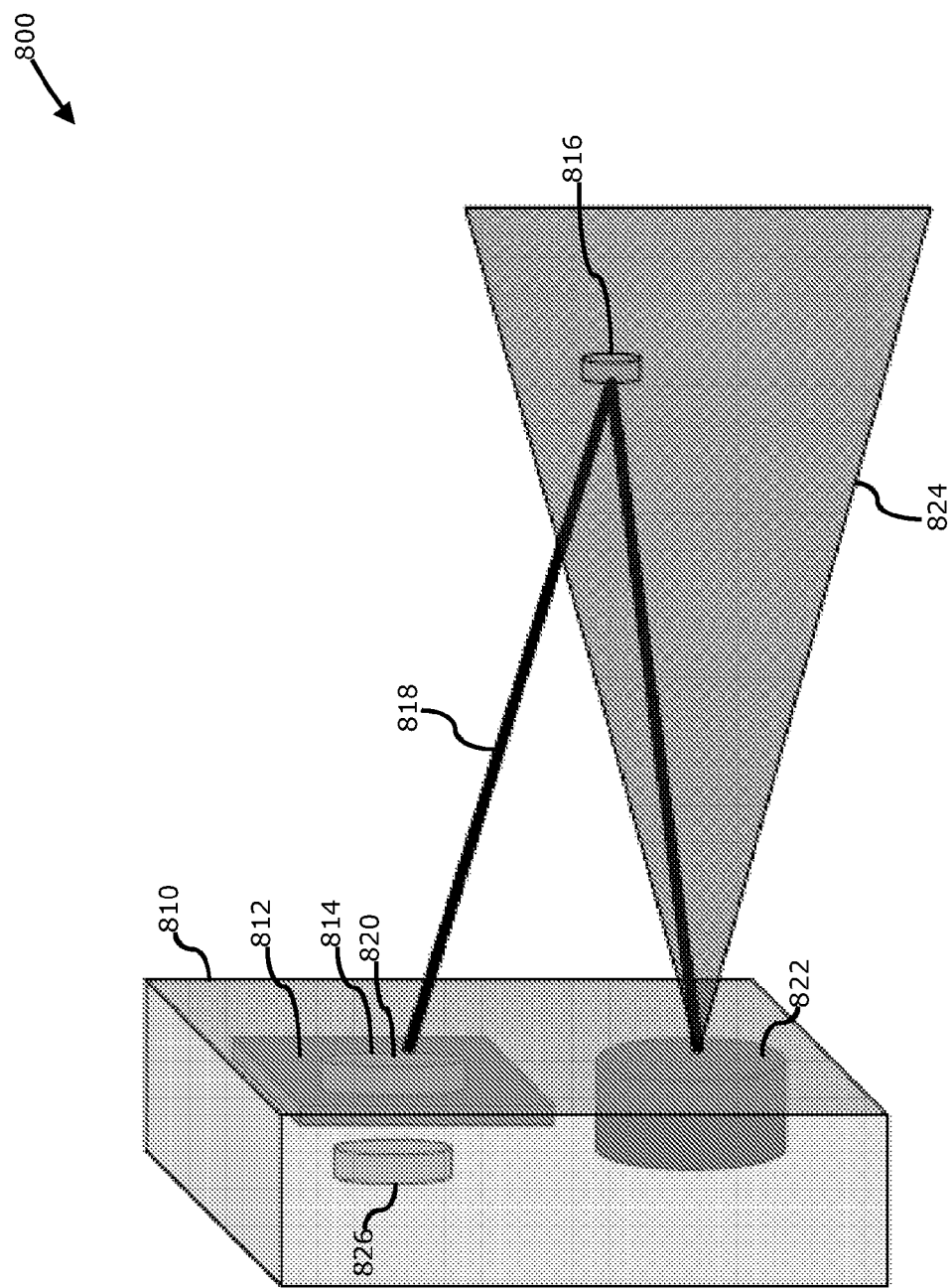
FIG. 8 is a diagram of an input device for a scanned beam display having a scanning bore sight in accordance with one or more embodiments.

Referring now to FIG. 8, a diagram of an input device for a scanned beam display having a scanning bore sight in accordance with one or more embodiments will be discussed. In one or more embodiments of an input system 800, input device 810 may comprise a two-dimensional MEMS scanner 812 comprising a scanning disc 814 having a small bore sight 820 in the center of scanning disc 814. Bore sight 820 may comprise a hole that runs the entire depth of the MEMS scanner 812, which in one embodiment may be about 400 μm, to function a directable bore sight. Any ray of light that is collinear with this bore sight 820 will pass through the bore sight 820 and illuminate onto a photodetector 826 mounted directly behind the MEMS scanner 812. The light will travel through the bore sight 820, through the substrate of the MEMS scanner 812, which may be for example Pyrex, and onto the surface of photodetector 826. In one or more embodiments, photodetector 826 may comprise an infrared (IR) photodetector. As the scanning disk 812 is scanned in am X-Y raster scan pattern, the bore sight 820 is scanned in different directions, and as a result different angles of incident light will be allowed to illuminate photodetector based upon the direction that the direction in which the bore sight 820 is aligned.

An emitter which may comprise an IR LED 822 is collocated with the MEMS scanner 812 to emit light in relatively broad cone 816. A portion of the light of cone 824 may reflect off of a point reflector 816 that may be worn on the user's thumb or finger, or that may be disposed on an end of stylus and reflects light back to MEMS scanner 812 as reflected beam 818. The position of point reflector 816 relative to the MEMS scanner 812 will change the incident angle of the reflected beam 818 onto the MEMS scanner 812. As the scanning mirror 814 of MEMS scanner 812 scans back and forth and up and down, the reflected light beam 818 from the point reflector 818 will be sensed by photodetector 826 at the point in time when bore sight 820 is perfectly aligned with the reflector 816. The X and Y position information of point reflector 816 may be determined by measuring the point in time when photodetector 826 senses the light relative to the phase of the horizontal and vertical oscillators driving scanning mirror 814. Such a measurement is the time delay from the horizontal sync pulses 318 and vertical sync pulses 316 as shown in and described with respect to FIG. 3. In an alternative embodiment, instead of reflector 816, IR LED 822 could be moved to the location of reflector by disposing IR LED 822 on the user's finger or at the end of stylus 132, thereby removing the need for reflector 816 and the need for LED 822 to be disposed in MEMS scanner 812.

In one or more embodiments, MEMS scanner 812 comprises a relatively smaller size die as its only function may be to provide a bore sight 820 to scan. The scanning disk 814 around the bore sight 820 serves to shield photodetector 826 from light that is not collinear to the bore sight 820. A mask may be applied to a bottom side of the Pyrex substrate of MEMS scanner 812 having an aperture opening larger than the bore sight 820 but smaller than the scanning disk 814. In such an arrangement, light that passes outside of the diameter of the scanning disk 814 may be shielded from reaching photodetector 826, so that only light that is collinear with the bore sight 820 will illuminate onto photodetector 826.

In one or more embodiments, input device 810 comprising MEMS scanner 812, emitter 822, and photodetector 826 may be located below a keyboard of a laptop computer. Point reflector 816 may be worn on the user's thumb or finger as part of a finger sleeve, band, or similar apparatus. The user moves his or her thumb or finger back and forth in the general area of the scanner below the space bar which may be illuminated by emitter 822 with cone 824. In one or more embodiments, input device 810 may be incorporated into a wearable computer, and input device 810 may comprise a module on a ring worn on a finger of the user. Input device 810 may be wirelessly connected to the wearable computer and may operate from battery power.

In one or more embodiments, input device 810 could be incorporated as wearable mouse that is part of a wearable cellular telephone having a wearable display 100, and a wearable ear phone and microphone. In such an embodiment, there may be no need for a body or housing of the phone as phone numbers could be dialed via use of input device 810 operating as a mouse interactively with numbers displayed on the projected image 128 of display 100. With no need for keypad buttons, no need for a liquid crystal (LCD) display, and no need for the ear phone and microphone, there would be no need for the phone housing itself. In such an arrangement, the phone's communication electronics may be located in the wearable display 100, and the wearable input device 810 may be wirelessly linked to the wearable display 100.

In some particular embodiments of an input system 800, input device 810 may not include LED 822 or point reflector 816. Instead, the function provided by point detector 816 as discussed, above, may be provided with a laser pointer or similar device that illuminates the region that was otherwise occupied by reflector 816. The reflection of the beam spot generated by the laser pointer will be detected by detector 826 when bore sight 820 is aligned to receive the reflected beams from the beam spot, and the X-Y coordinate position of the beam spot may then be determined. Furthermore, Z coordinate position information may be determined based at least in part on the size of the beam spot in a manner similar to the manner in which the size of shape 510 may encode Z information as shown in and described with respect to FIG. 5. Similarly, the beam spot generated by the laser pointer may be shaped in a manner similar to shape 510 so that the angular rotation of the laser pointer, and thus the angular rotation of the beam spot, may be detected in a manner similar to the manner in which the angular rotation of shape 510 may encode rotational information W as shown in and described with respect to FIG. 5, although the scope of the claimed subject matter is not limited in this respect.

In general, input device 810 comprises an angular position sensing device that measures the X and Y angular position of a point reflector 816 or illuminator with respect to a MEMS scanner 810. Example applications for input device 810 may include industrial controls and robotics, for example. Input device 810 is capable of detecting positions over a relatively larger area as input device 810 comprises obtains angular measurements rather displacement measurements with typical mouse type input devices.

Although the claimed subject matter has been described with a certain degree of particularity, it should be recognized that elements thereof may be altered by persons skilled in the art without departing from the spirit and/or scope of claimed subject matter. It is believed that the subject matter pertaining to an input device for a scanned beam display and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
illuminating a scanning mirror in a scanning platform with a laser light source;
modulating deflection of the scanning mirror to generate a raster scanning output beam that scans a trajectory in two dimensions;
modulating the laser light source synchronous to movement of the scanning mirror to modulate the raster scanning output beam and illuminate pixels in the trajectory of the raster scanning output beam to project a displayed image;
receiving a reflection of a selected pixel from a movable reflector placed in the trajectory of the raster scanning output beam at a location of the selected pixel in the displayed image; and
correlating a timing of the reflection of the selected pixel with a timing of the raster scanning output beam to determine a coordinate position of said reflector within the displayed image;
wherein the coordinate position includes an X position and a Y position, and correlating to determine the coordinate position comprises correlating a phase of the reflection of the selected pixel relative to a horizontal sync pulse to determine the X position, and determining the Y position from a timing delay between the reflection of the selected pixel and a vertical sync pulse.

2. A method as claimed in claim 1, said scanning platform comprising a MEMS based scanner.

3. A method as claimed in claim 1, wherein the reflector comprises a reflector on a stylus.

4. A display system comprising:
a scanned beam display to generate a raster scan with a scanning platform to project a displayed image via a scanned beam of photons;
a movable reflector capable of being placed at a point in the raster scan corresponding to a selected pixel in the displayed image to reflect illumination of the selected pixel within the displayed image;
a photodetector to detect the reflected illumination of the selected pixel within the displayed image; and
a correlating circuit to correlate a timing of the illumination of the photodetector with a timing of the raster scan to determine a coordinate position of the movable reflector;

wherein the coordinate position includes an X position and a Y position, and the correlating circuit is configured to correlate a phase of the reflected illumination of the selected pixel relative to a horizontal sync pulse to determine the X position, and further configured to determine the Y position from a timing delay between the reflection of the selected pixel and a vertical sync pulse.

5. A display system as claimed in claim 4, wherein the reflector is disposed at the end of a stylus.

6. A display system as claimed in claim 4, wherein the reflector comprises a retroreflector.

7. A display system as claimed in claim 4, wherein the correlating circuit is embodied by a display controller in the scanned beam display coupled to receive an output of the photodetector.

8. A display system as claimed in claim 4, wherein the scanning platform comprises a MEMS scanner, and the output beam comprises a laser beam.

* * * * *